(12) United States Patent
Chun et al.

(10) Patent No.: US 12,428,008 B2
(45) Date of Patent: Sep. 30, 2025

(54) SYSTEM FOR ENABLING A VEHICLE TO PERFORM A CIRCUIT MODE

(71) Applicants: HYUNDAI MOTOR COMPANY, Seoul (KR); KIA CORPORATION, Seoul (KR)

(72) Inventors: Ho Kyun Chun, Seoul (KR); Jae Sung Bang, Yongin-si (KR); Seok Hwan Choi, Seoul (KR); Dong Hyeon Woo, Daegu (KR); Dae Woong Hwang, Yongin-si (KR); Daw Ki Hong, Hwaseong-si (KR); Ho Won Seo, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 257 days.

(21) Appl. No.: 18/078,549

(22) Filed: Dec. 9, 2022

(65) Prior Publication Data
US 2023/0382409 A1    Nov. 30, 2023

(30) Foreign Application Priority Data
May 27, 2022   (KR) .......................... 10-2022-0065062

(51) Int. Cl.
*B60W 50/08* (2020.01)
*B60K 35/00* (2024.01)
(Continued)

(52) U.S. Cl.
CPC ........... *B60W 50/082* (2013.01); *B60K 35/00* (2013.01); *B60W 50/14* (2013.01); *B60K 35/23* (2024.01);
(Continued)

(58) Field of Classification Search
CPC ............... B60W 50/082; B60W 50/14; B60W 2050/146; B60W 2556/45; B60W 30/182;
(Continued)

(56) References Cited

U.S. PATENT DOCUMENTS

RE49,258 E * 10/2022 Spillane .............. B60W 50/082
2019/0057552 A1 * 2/2019 Ko ............................ G06T 7/20
(Continued)

FOREIGN PATENT DOCUMENTS

JP   2019084113 A   6/2019
JP   2021110322 A   8/2021
(Continued)

OTHER PUBLICATIONS

TrailMeister, "Using Your Phone as a GPS", trailmeister.com, 2019 (Year: 2019).*

(Continued)

*Primary Examiner* — Tiffany P Young
*Assistant Examiner* — Shien Ming Chou
(74) *Attorney, Agent, or Firm* — Lempia Summerfield Katz LLC (57) ABSTRACT

Proposed is a system for enabling a vehicle to perform a circuit mode. The system includes a communication unit provided in the vehicle to communicate with a vehicle-external device, a service providing server provided in the vehicle-external device to provide information related to a circuit, a controller which recognizes a current position of the vehicle by receiving a signal related to a vehicle position and which determines whether the vehicle arrives at the circuit based on the current position of the vehicle and the information related to the circuit received from the service providing server via the communication unit, the controller being configured to perform control for a circuit guide function that provides guide information related to the (Continued)

circuit mode and circuit driving when the vehicle enters the circuit mode, and an input/output unit outputting and providing the guide information to a driver by controlling the controller.

19 Claims, 4 Drawing Sheets

(51) Int. Cl.
  *B60K 35/23* (2024.01)
  *B60K 35/28* (2024.01)
  *B60W 50/14* (2020.01)
(52) U.S. Cl.
  CPC ........ *B60K 35/28* (2024.01); *B60K 2360/172* (2024.01); *B60W 2050/146* (2013.01); *B60W 2556/45* (2020.02)
(58) Field of Classification Search
  CPC ......... B60W 2552/05; B60W 2710/08; B60W 2710/242; B60W 2756/10; B60K 35/00; B60K 35/23; B60K 35/28; B60K 2360/172; B60K 35/29; B60K 35/26; B60Y 2400/92

USPC .......................................................... 701/23
  See application file for complete search history.

(56) References Cited

U.S. PATENT DOCUMENTS

| | | | |
|---|---|---|---|
| 2019/0193750 A1* | 6/2019 | Kim | ....................... B60W 10/08 |
| 2019/0316932 A1 | 10/2019 | Andreucci | |
| 2021/0331591 A1* | 10/2021 | Santiago | ................... B60L 3/12 |
| 2023/0159043 A1* | 5/2023 | Kim | ....................... B60W 40/08 |
| | | | 701/41 |

FOREIGN PATENT DOCUMENTS

| | | | | |
|---|---|---|---|---|
| KR | 20160037816 A | * | 4/2016 | ............. G06Q 50/30 |
| KR | 101868407 B1 | | 6/2018 | |
| KR | 102246932 B1 | | 4/2021 | |
| WO | WO-2016020195 A1 | * | 2/2016 | ............ B60W 30/18 |

OTHER PUBLICATIONS

SoUtHpAw, "Asphalt 8 Airborne: French Guiana Time Attack Championship", Youtube.com, 2018 (Year: 2018).*

* cited by examiner

SYSTEM FOR ENABLING A VEHICLE TO PERFORM A CIRCUIT MODE

CROSS REFERENCE TO RELATED APPLICATION

The present application claims the benefit of and priority to Korean Patent Application No. 10-2022-0065062, filed in the Korean Intellectual Property Office on May 27, 2022, the entire contents of which are incorporated herein for all purposes by reference.

TECHNICAL FIELD

The present disclosure relates to a system for enabling a vehicle to perform a circuit mode. More particularly, the present disclosure relates to a system for enabling an ordinary driver to more conveniently drive and experience a circuit by using a vehicle of the driver.

BACKGROUND

The statements in this section merely provide background information related to the present disclosure and may not constitute prior art.

Traditionally, car racing has entailed people competing in speed competitions using vehicles. Conventionally, car racing has taken place in the form of competitions in car racing arenas, and ordinary people have satisfied their desire for speed competitions and racing by watching car racing in car racing arenas.

There were few opportunities for ordinary drivers to perform car racing in car arenas, and only racers who chose to race as a profession were primarily allowed to participate in car racing. Although ordinary drivers often perform car racing on normal roads, racing on normal roads is illegal and also has a very high risk of accident.

However, recently, as the base of motor sports has expanded and the performance of vehicles has gradually improved, the desire for speed competitions and racing is increasing.

Therefore, many vehicle manufacturers hold various events such as a races in circuits that include tracks for car racing for ordinary people.

In addition, recently, a number of circuits that allow ordinary drivers to experience racing have been built and constructed all over the country, and such circuits can be used via a simple procedure.

A driver who uses a circuit can check a lap time on the corresponding circuit, and may compare the lap time with lap times of companions or other drivers who have used the same circuit. Through this, the driver can enjoy high-speed driving while also comparing driving skills with other people.

As the interest in circuit driving and the desire for speed competition increases, understanding of the vehicle and the circuit is increased, and the desire of drivers who want to drive in a high-speed environment is increasing.

SUMMARY

Accordingly, the present disclosure has been made while keeping in mind the above problems occurring in the related art, and an objective of the present disclosure is to provide a system for enabling a vehicle to perform a circuit mode. The system is capable of enabling an ordinary driver to more conveniently experience and perform circuit driving by using a vehicle of the driver, thereby being capable of satisfying the desire of high-speed driving of the driver and also being capable of increasing a commercial value of the vehicle.

The objectives that can be obtained from the present disclosure are not limited to the above-mentioned objectives, and other objectives not mentioned herein should be clearly understood by those ordinarily skilled in the art from the following description.

In an embodiment of the present disclosure, a system for enabling a vehicle to perform a circuit mode includes: a communication unit provided in the vehicle so as to communicate with a vehicle-external device; a service providing server provided in the vehicle-external device and configured to provide information related to a circuit; and a controller configured to recognize a current position of the vehicle by receiving a signal related to a vehicle position and configured to determine whether the vehicle arrives at the circuit based on the current position of the vehicle and the information related to the circuit received from the service providing server via the communication unit. In particular, the controller is configured to perform control for a circuit guide function that provides guide information related to the circuit mode and circuit driving when the vehicle enters the circuit mode. The system further includes an input/output unit configured to output and provide the guide information related to the circuit mode and the circuit driving to a driver by controlling the controller.

In this manner, according to the system for enabling the vehicle to perform the circuit mode, since helpful information that the driver needs is transmitted and the circuit guide function is provided during circuit driving, the driver's understanding of the vehicle and the circuit may be increased. Furthermore, since the desire of speed competition of the driver and the desire of fun driving of the driver may be satisfied, there is an effect that a commercial value of the vehicle may be further increased.

BRIEF DESCRIPTION OF THE DRAWINGS

The above and other objectives, features, and advantages of the present disclosure should be more clearly understood from the following detailed description when taken in conjunction with the accompanying drawings, in which.

DETAILED DESCRIPTION

An embodiment of the present disclosure is described in detail with reference to the accompanying drawings. Specific structures and functions stated in the present disclosure are provided to illustrate embodiments according to the spirit of the present disclosure which can be achieved in various ways. Furthermore, the present disclosure should not be construed as being limited to the following embodiments and should be construed as including all changes, equivalents, and replacements included in the spirit and scope of the present disclosure.

Furthermore, in the present disclosure, terms including "first" and "second" may be used to describe various components, but the components are not limited to the terms. The terms are used to distinguish one component from another component, and for instance, a first component may be referred to as a second component, and similarly, a second component may be referred to as a first component without departing from the scope according to the spirit of the present disclosure.

When a component is referred to as being "connected" or "coupled" to another component, it should be understood that it may be directly connected or coupled to the other component, but other components may exist therebetween. On the other hand, when a component is referred to as being "directly connected" or "directly contacted" to another component, it should be understood that there is no other component therebetween. Expressions for describing relationships between components, i.e. "between," "directly between," "adjacent to," and "directly adjacent to" should be construed in the same way.

When a component, device, element, or the like of the present disclosure is described as having a purpose or performing an operation, function, or the like, the component, device, or element should be considered herein as being "configured to" meet that purpose or to perform that operation or function.

Like reference symbols denote like elements throughout the specification. Terms used in the specification are used to describe embodiments of the present disclosure and are not intended to limit the scope of the present disclosure. In the specification, the terms of a singular form may include plural forms unless otherwise specified. It should be further understood that the terms "comprise," "include," "have," and the like, when used in this specification, specify the presence of stated components, steps, operations, or elements, but do not preclude the presence or addition of one or more other components, steps, operations, or elements thereof.

Figure 1:
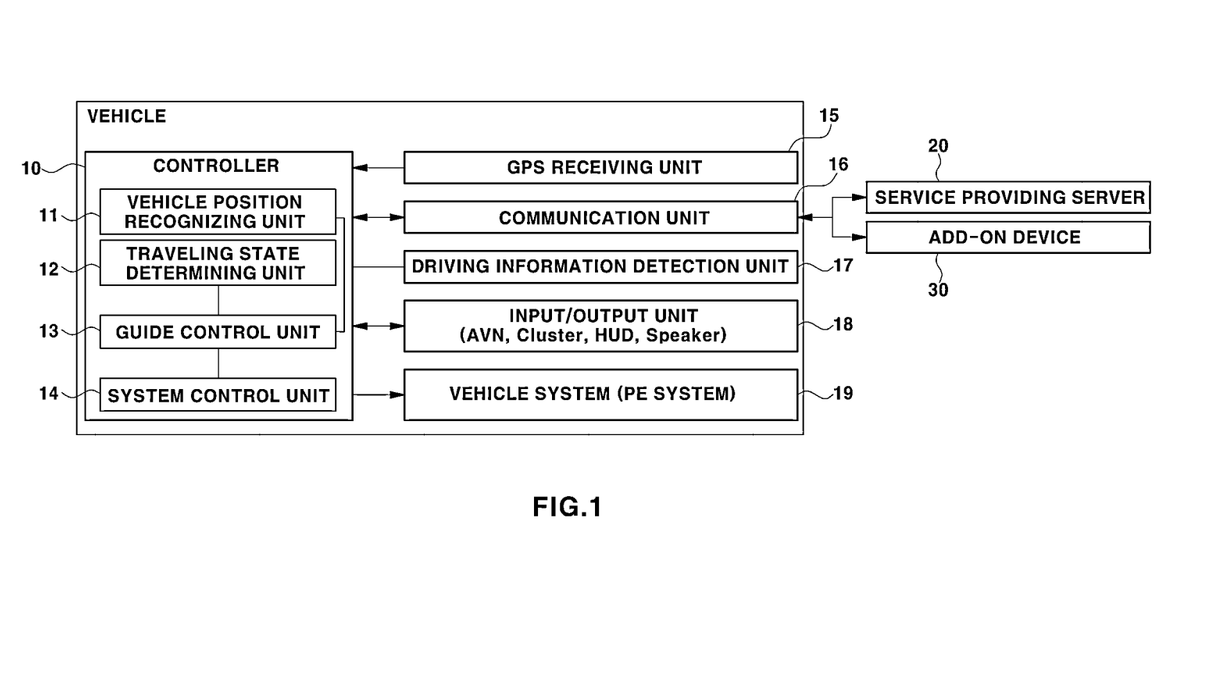
FIG. 1 is a block diagram illustrating a configuration of a system for enabling a vehicle to perform a circuit mode according to an embodiment of the present disclosure.

FIG. 1 is a block diagram illustrating a configuration of a system for enabling a vehicle to perform a circuit mode. As illustrated in the drawing, a system for enabling a vehicle to perform a circuit mode includes an in-vehicle device mounted in the vehicle and includes a vehicle-external device provided such that the vehicle-external device is capable of communicating with the vehicle from outside the vehicle.

The in-vehicle device may include a controller 10, a Global Positioning System (GPS) receiving unit 15, a communication unit 16, a driving information detection unit 17, an input/output unit 18, and a vehicle system 19. Furthermore, the vehicle-external device may include a service providing server 20 and an add-on device 30.

In the configuration as described herein, the controller is configured to perform control of the vehicle and to perform control for performing of the circuit mode according to the present disclosure. Furthermore, the controller 10 includes a vehicle position recognizing unit 11 which judges and determines a current position of the vehicle in real time based on a signal (for example, a GPS signal) related to a vehicle position received from outside, a traveling state determining unit 12 determining a driving state and a traveling state of the vehicle based on information collected from the vehicle, a guide control unit 13 which collects various information related to the circuit mode and which performs control for guiding the various information to a driver, and a system control unit 14 performing control on the vehicle system 19 when the vehicle enters a circuit.

Components composing the controller 10 in the present disclosure as described herein, i.e., the vehicle position recognizing unit 11, the traveling state determining unit 12, the guide control unit 13, and the system control unit 14, may perform cooperative control for the circuit mode of the vehicle while exchanging information with each other.

In addition, the GPS receiving unit 15 is provided such that the GPS receiving unit 15 receives a GPS signal indicating a current position of the vehicle from outside the vehicle. In addition, the GPS receiving unit 15 is provided such that the GPS receiving unit 15 is capable of inputting the GPS signal that is received as a signal related to a vehicle position to the vehicle position recognizing unit 11 of the controller 10.

In addition, from the vehicle, the communication unit 16 may receive a signal related to the vehicle position by communicating with the vehicle-external device. The signal received by the communication unit 16 is input to the vehicle position recognizing unit 11 of the controller 10.

The vehicle-external device may specifically be a smart device such as a smartphone, a tablet, or the like having a GPS sensor mounted therein, in which the smart device is an add-on device 30 that is connected such that the add-on device 30 is capable of communicating with the communication unit 16 of the vehicle. The communication unit 16 may be a kind of communication interface unit provided to communicate with the smart device.

Accordingly, the vehicle position recognizing unit 11 of the controller 10 is capable of judging and determining the current position of the vehicle by using the GPS signal that is received and input through the GPS receiving unit 15 or by using the signal related to the vehicle position that is received and input through the communication unit 16.

Next, the driving information detection unit 17 is a component that detects information indicating the driving state and the traveling state in real-time of the vehicle, in which the information is vehicle driving information. Furthermore, the vehicle driving information in real-time detected by the driving information detection unit 17 may include vehicle state information and driver driving input information.

In an embodiment of the present disclosure, the driving information detection unit 17 may include an accelerator pedal detection unit that detects accelerator pedal input information according to accelerator pedal operation of the driver. In addition, the driving information detection unit 17 may include a brake pedal detection unit that detects brake pedal input information according to brake pedal operation of the driver.

In addition, the driving information detection unit 17 may further include a steering angle detection unit that detects a steering angle according to steering wheel operation of the driver. In addition, the driving information detection unit 17 may further include an acceleration detection unit that detects acceleration of the vehicle.

The accelerator pedal detection unit may be a conventional accelerator pedal sensor (i.e., Accelerator Position Sensor, APS) which is mounted in an accelerator pedal and which outputs an electrical signal according to a driver's accelerator pedal operation state. The brake pedal detection unit may be a conventional brake pedal sensor (BPS) which is mounted in a brake pedal and which outputs an electrical signal according to a driver's brake pedal operation state.

In addition, the acceleration detection unit may be a conventional G-force sensor, and the steering angle detection unit may be a conventional steering angle sensor (SAS) which outputs an electrical signal according to the steering wheel operation of the driver.

In addition, the driving information detection unit 17 may further include a wheel speed detection unit that detects a wheel speed, and the wheel speed detection unit may be a conventional wheel speed sensor. In addition, from a signal of the wheel speed sensor, the controller 10 may acquire wheel speed information and vehicle speed information. It is a well-known technology in the art that the vehicle speed information can be acquired from the signal of the wheel speed sensor, so the detailed description thereof is omitted.

In addition, instead of using the signal of the wheel speed detection unit (wheel speed sensor) to acquire the vehicle speed information, the driving information detection unit 17 may further include a separate vehicle speed detection unit. Alternatively, in the controller 10, the vehicle speed information may be acquired in real-time based on vehicle position information acquired from the GPS signal.

Accordingly, the vehicle driving information may include an accelerator pedal input value (APS value) which is a driving input value according to accelerator pedal operation by the driver and which is detected by the accelerator pedal unit and may include a brake pedal input value (BPS value) which is the driving input value according to brake pedal operation by the driver and which is detected by the brake pedal detection unit.

In addition, the vehicle driving information may further include vehicle acceleration detected by the acceleration detection unit, and a steering angle detected by the steering angle detection unit. Furthermore, the vehicle driving information may further include a wheel speed detected by the wheel speed detection unit. In addition, the vehicle driving information may further include a vehicle speed which is acquired from the signal of the wheel speed detection unit or the GPS signal or which is detected by the vehicle speed detection unit.

As described herein, in the real-time vehicle driving information indicating a current driving state and a current traveling state of the vehicle, the accelerator pedal input value and the brake pedal input value that are pedal input (an acceleration input and a brake input) information, and the steering angle that is steering input information become the driver driving input information. Furthermore, the vehicle acceleration, the wheel speed, the vehicle speed, and on the like become the vehicle state information.

Moreover, the driving information detection unit 17 may optionally include a sensor that detects a temperature of a motor, a component such as a battery, an engine oil, or a coolant, a sensor that detects a rotation speed of an operating apparatus (such as an engine or the motor), a sensor that detects a pressure of brake fluid or a pressure of a tire, and the like. In the real-time vehicle driving information, the vehicle state information further includes information detected by the sensors described herein.

In the vehicle, the real-time vehicle driving information acquired by the driving information detection unit 17 is input to the traveling state determining unit 12 of the controller 10, so that the traveling state determining unit 12 is capable of judging and recognizing the driving state and the traveling state of the vehicle based on the signal of the driving information detection unit 17. As such, when the driving state and the traveling state of the vehicle are determined, the traveling state determining unit 12 may transmit the driving state and the traveling state of the vehicle to the guide control unit 13.

The communication unit 16 is provided to perform wired or wireless communication with the vehicle-external device, and the information received from the vehicle-external device through the communication unit 16 may be transmitted to the vehicle position recognizing unit 11, the traveling state determining unit 12 or the guide control unit 13, and the system control unit 14 of the controller 10.

The communication unit 16 may include a communication device of an Audio, Video & Navigation (AVN) system, the communication device being mounted in the vehicle and being capable of performing wireless communication with the vehicle-external device via a mobile communication network. Moreover, the communication unit 16 is capable of being adopted without limitation as long as the communication unit 16 is provided in the vehicle and is capable of performing wireless communication between the controller 10 and the vehicle-external device.

The vehicle-external device may be the service providing server 20 and the add-on device 30, and the add-on device 30 that communicates with the communication unit 16 of the vehicle may be a smart device such as a smartphone, a tablet, a wearable device, and so on.

In addition, when the add-on device 30 is connected in a wired manner or a wireless manner, the communication unit 16 may further include a communication interface unit such as a connector or a transceiver that enables the communication between the controller 10 and the add-on device 30.

For example, the communication unit 16 may further include the connector of the vehicle, the connector enabling the communication between the controller 10 and the add-on device 30 while the add-on device 30 is in a connected state. Furthermore, the connector may be a diagnosis connector, and may specifically be an On-Board Diagnostics (OBD) connector.

The input/output unit 18 is connected to the controller and includes an input device operated by the driver to input or select information desired for the circuit mode or a circuit traveling and an output device that outputs information. Furthermore, the input device of the input/output unit 18 may be a button or a switch provided in the vehicle. Alternatively, the input device of the input/output unit 18 may be a touch screen or the like. Accordingly, when the driver operates the input device of the input/output unit 18, input information or selected information according to the operation is capable of being input to the controller 10.

In addition, the output device of the input/output unit 18 may include a display device provided to display various information in the vehicle. Furthermore, the output device of the input/output unit 18 may further include a sound output device provided to output auditory information as sound via a vehicle speaker.

The input device and the output device of the input/output unit 18 may be an input device and a display device of an AVN system. Furthermore, a cluster or a Head-Up Display (HUD) may be used as a display device in the output device of the input/output unit 18.

The head-up display may be an Augmented Reality (AR) head-up display that displays information as an augmented reality image on a windshield glass of the vehicle.

Moreover, the add-on device 30 communicatively connected, such as a smartphone, may be used as the input/output unit 18. Furthermore, when the driver uses a smartphone in which an application is installed, the driver is capable of inputting or receiving desired information in the same manner as when the driver uses the input/output unit 18 of the vehicle.

The input/output unit 18 may be connected to the guide control unit 13 among the components of the controller 10. Furthermore, the input/output unit 18 may be connected to the guide control unit 13 so that the guide control unit 13 is capable of receiving desired information via the input device of the input/output unit 18, and the information input to the guide control unit 13 via the input/output unit 18 may be transmitted to the traveling state determining unit 12 or the system control unit 14. In addition, the guide control unit 13 may control the operation of the output device in the input/output unit 18 such that determined information such as information related to the circuit mode is output and the driver is guided.

In addition, in an embodiment of the present disclosure, the driver may input and set a setting value related to the circuit mode to the controller 10 by moving to a User Setting Mode (USM) via the input device and the output device (display device, e.g., cluster) of the input/output unit 18.

For example, in the USM, the driver may set turning on and off of the circuit mode. If the circuit mode is set to be turned on, then when the vehicle enters a circuit, control for the circuit mode may be performed by the controller 10. On the other hand, if the circuit mode is set to be turned off, the control for the circuit mode is not performed.

In an embodiment of the present disclosure, the guide control unit 13 determines whether the vehicle has arrived at the circuit by communicating with the AVN system based on current position information of the vehicle input from the vehicle position recognizing unit 11. Furthermore, through the output device (display device or sound output device) of the input/output unit 18, the driver may be notified that the vehicle has arrived at the circuit if the vehicle has arrived at the circuit.

The AVN system receives various information about the circuit from the service providing server 20 or the add-on device via the communication device in other words one of the communication unit 16 of the vehicle and then the AVN system transmits the various information to the guide control unit 13 of the controller 10. For example, the AVN system optionally receives information related to the circuit, such as a circuit position, from the service providing server 20 or the add-on device 30 and then the AVN system may transmit the information related to the circuit to the guide control unit 13 of the controller 10.

Therefore, the guide control unit 13 is capable of determining whether the vehicle has arrived in the current circuit based on the current position information of the vehicle input from the vehicle position recognizing unit 11 and based on information (circuit position information) related to the circuit input from the AVN system.

In addition, after the guide control unit 13 receives information received from the service providing server 20 or the add-on device 30 via the communication unit 16 that is the communication device of the AVN system as an example, the guide control unit 13 may transmit the received information to other components in the controller 10.

For example, the guide control unit 13 may receive information related to the circuit or driver information from the service providing server 20 or the add-on device 30 through the communication device of the AVN system, and then the guide control unit 13 may transmit the received information to the traveling state determining unit 12 or the system control unit 14. In addition, when the vehicle arrives at the circuit and enters the circuit mode, the guide control unit 13 may transmit a signal for informing that the vehicle enters the circuit mode to the system control unit 14.

The system control unit 14 may perform control desired for traveling of the vehicle in the circuit mode based on a circuit mode entry signal that is input from the guide control unit 13. Specifically, when the system control unit 14 recognizes that the vehicle has arrived at the circuit and the vehicle enters the circuit mode by the circuit mode entry signal input from the guide control unit 13, the system control unit 14 may release a limit value of the vehicle system 19 for operating the vehicle. Furthermore, as the limit value of the vehicle system 19 is released, a fail safety condition about an apparatus or a component of the vehicle system 19 is capable of being changed.

The vehicle system 19 for operating the vehicle may be a vehicle operating system including an operating apparatus (an engine, a motor, or the engine and the motor) that operates the vehicle. Furthermore, in an electric vehicle, the vehicle system 19 may be a Power Electronics (PE) system including a motor, an inverter for operating and controlling the motor, and a battery which is connected to the motor and which is capable of being charged or discharged via the inverter. The limit value of the vehicle system 19 may include a limit value related to the operating system or a limit value related to the PE system.

In the present disclosure, an example of the limit value related to the PE system is a battery usage limit value that defines a battery usage range, a motor usage limit value, or the like. Moreover, the limit value related to the operating system, or the limit value related to the PE system may include a maximum vehicle speed value, a torque limit value of the operating apparatus (the engine, the motor, or the engine and the motor), or the like. In other words, the limit value related to the PE system may include at least one of the battery usage limit value, the motor usage limit value, the maximum vehicle speed value, and the torque limit value of the motor.

In addition, based on the current position information of the vehicle input from the vehicle position recognizing unit 11 and based on the driving state information and the traveling state information of the vehicle input from the traveling state determining unit 12, the guide control unit 13 outputs and informs information related to the circuit suitable for the current driving state of the vehicle via the output device of the input/output unit 18.

In the description as described herein, the system for enabling the vehicle to perform the circuit mode according to the present disclosure has been described in detail with reference to FIG. 1. Hereinafter, a method of enabling the vehicle to perform the circuit mode according to the present disclosure is described in detail.

Figure 2:
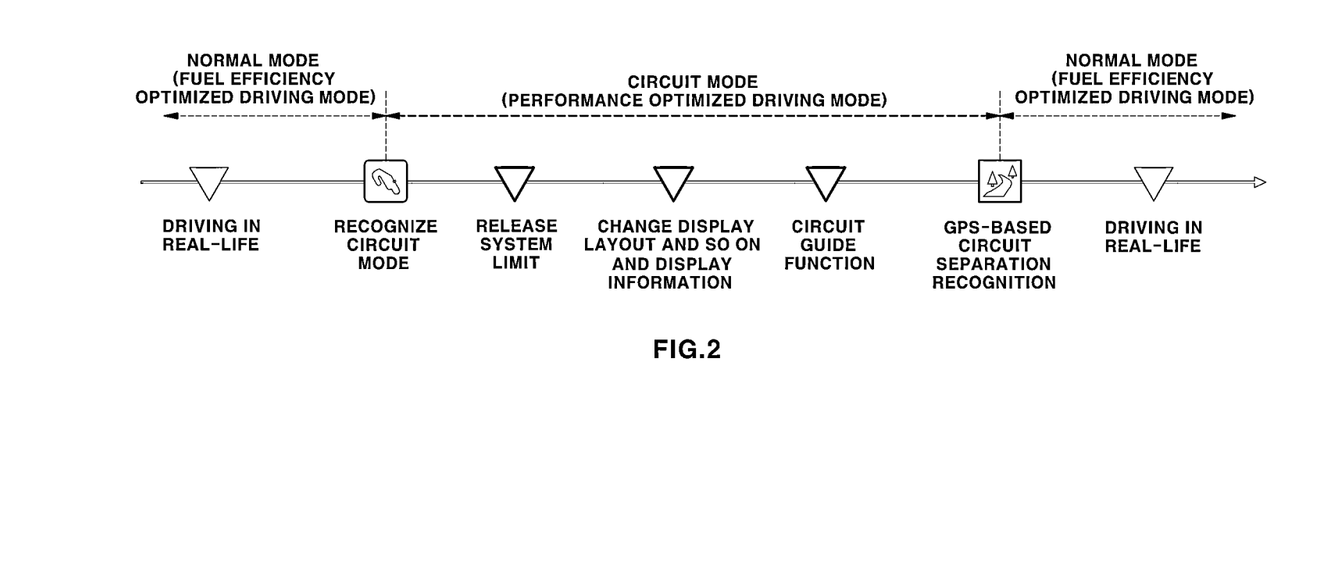
FIG. 2 is a view illustrating a process in which the vehicle in a normal mode in a normal state is switched to the circuit mode when the vehicle enters a circuit and then the vehicle is switched back again to the normal mode when the vehicle leaves the circuit according to an embodiment of the present disclosure.

FIG. 2 is a view illustrating a process in the present disclosure in which the vehicle in a normal mode in a normal state is switched to the circuit mode when the vehicle enters a circuit and then the vehicle is switched back again to the normal mode when the vehicle leaves the circuit. In addition, FIGS. 3 and 4 are flowcharts illustrating a process for enabling the vehicle to perform the circuit mode according to an embodiment of the present disclosure, in which FIG. 3 illustrates a process of recognizing the circuit mode in the present disclosure and FIG. 4 illustrates a process of performing a circuit guide function.

In the present disclosure, the normal mode refers to a real-life driving move in a normal state, and such a normal mode may be a conventional fuel efficiency optimized driving mode in which control of optimizing fuel efficiency is performed. On the other hand, the circuit mode is a driving mode when the vehicle enters the circuit and is regarded as a performance optimized driving mode in which control of optimizing performance is performed.

Figure 3:
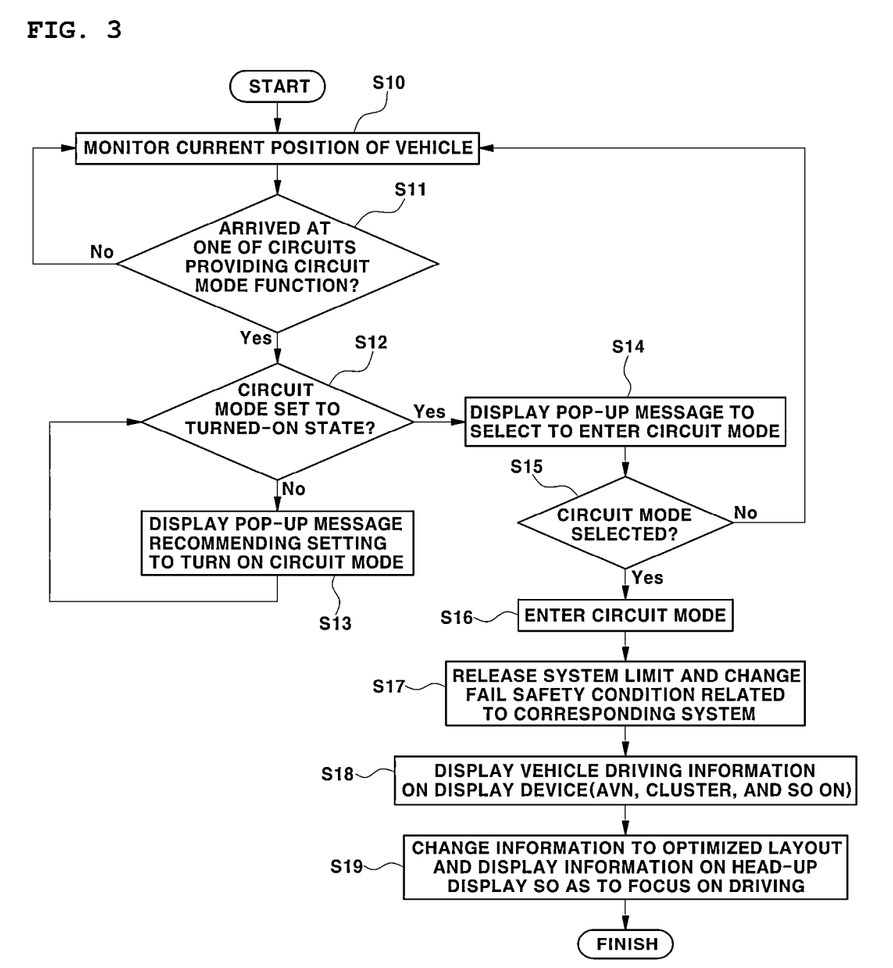
FIGS. 3 and 4 are flowcharts illustrating a process for enabling the vehicle to perform the circuit mode according to an embodiment of the present disclosure.
Figure 4:
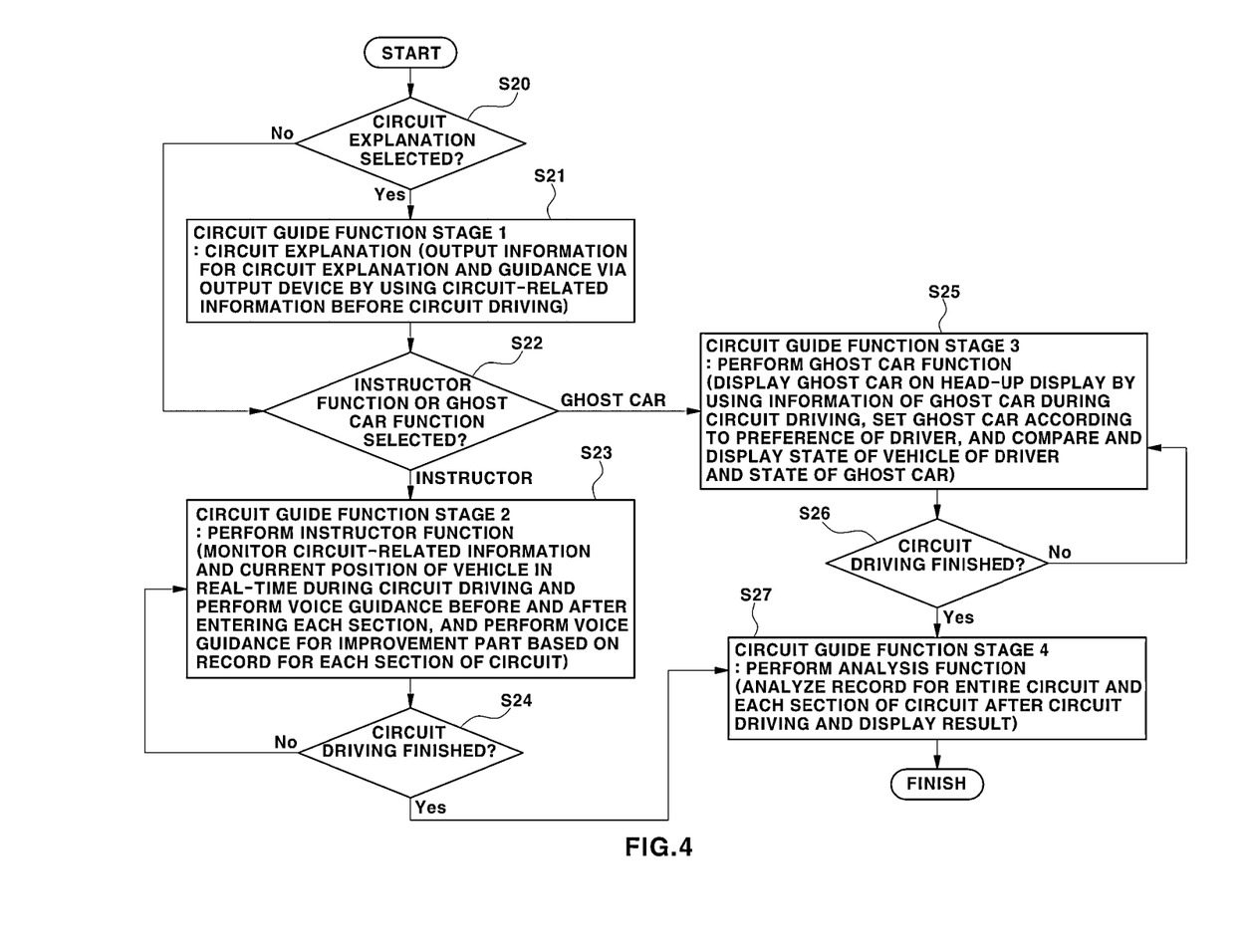

First, as illustrated in FIG. 3, a current position of the vehicle is determined and recognized at the vehicle position recognizing unit 11 of the controller 10 based on a signal received and input via the communication unit 16 (S10). In addition, the vehicle position recognizing unit 11 transmits monitored current position information of the vehicle to the guide control unit 13 of the controller 10 in real-time.

Then, when the vehicle drives on a normal road and then the vehicle arrives at the circuit that is a designated racing road, the circuit mode is recognized from the controller 10 of the vehicle. In other words, based on information related to the circuit, in which the information is received and input through the communication unit 16 from the service providing server 20 or the add-on device 30 that is the vehicle-external device, whether the vehicle currently arrives at one of the circuits, providing a circuit mode function is determined at the guide control unit 13 of the controller 10 (S11).

As described herein, based on the current position information of the vehicle input from the vehicle position recognizing unit 11 and based on circuit position information among the information related to the circuit received and input from the service providing server 20 or the add-on device 30, the guide control unit 13 may determine whether the circuit on which the vehicle currently arrives is a circuit providing the circuit mode function.

Then, the guide control unit 13 checks whether the driver set the circuit mode to be turned on in the User Setting Mode (USM) (S12). If the vehicle has arrived at the circuit and the driver has set the circuit mode to be turned on, the guide control unit 13 of the controller 10 displays a guide message to which a circuit mode entry is capable of being selected or input on the display device of the input/output unit 18 so that the driver is capable of selecting the circuit mode entry (S14). The guide message may be expressed in a form of a pop-up message.

On the other hand, if the circuit mode is not in an on state, the guide control unit 13 displays a guide message that recommends and informs to set the circuit mode to be turned on in the USM on the display device of the input/output unit 18 (S13). The guide message may be expressed in a form of a pop-up message.

The guide control unit 13 checks whether the driver selects the circuit mode entry (S15). When the circuit mode entry is selected by the driver, the guide control unit 13 enters the vehicle system 19 into the circuit mode via the system control unit 14 (S16).

Then, after the system control unit 14 checks whether the vehicle system 19 enters the circuit mode, the system control unit 14 releases a limit of the vehicle system 19 so that the use of the PE system or the operation of the operating system is maximized and the enjoyment of driving is maximized (S17).

In addition, as the limit of the vehicle system 19 is released as described herein, the system control unit 14 changes such as a fail safety condition about the apparatus and the component of the vehicle system 19.

In addition, in a state in which the vehicle enters the circuit, the guide control unit 13 may display real-time vehicle driving information desired during a circuit driving via the output device of the input/output unit (S18).

Specifically, the guide control unit 13 may display vehicle state information collected from the vehicle, the driver driving input information, information related to the performance of the vehicle, or the like via the cluster, the display device of the AVN system, or the HUD.

For example, at least one of a temperature of the engine oil (internal combustion engine vehicle), a temperature of the battery (hybrid vehicle or pure electric vehicle), a temperature of the motor (hybrid vehicle or pure electric vehicle), a temperature of coolant of each component, and a G-force in a lateral direction or in a longitudinal direction may be displayed.

Moreover, at least one of important factors during the circuit driving, which are known, such as a vehicle speed, a rotation speed of the operating apparatus (engine RPM or Motor RPM), a torque of the operating apparatus (the torque may be a command value), a turbo operating state, a power, lap time information, a gear position, a throttle state, an APS value, a BPS value, a steering angle, a pressure of a brake, a pressure of a tire, and so on may be displayed.

In addition, in displaying the information as described herein, the guide control unit 13 may change display information to a set layout of the circuit mode in other words optimized so that the driver can focus on driving and may display the changed display information on the display device of the input/output unit 18, such as the HUD, or the like (S19).

In addition, the guide control unit 13 of the controller performs a circuit guide function by performing cooperative control with other components in the controller 10. Furthermore, the circuit guide function may be regarded as a function providing and informing set guide information related to the circuit mode and the circuit driving of the vehicle before, during, and after driving the circuit by displaying the set guide information on the output device (one or both of the display device and the sound output device) to the driver.

In the present disclosure, the circuit guide function may include a circuit explanation function, an instructor function, a ghost car function, and an analysis function.

First, the guide control unit 13 of the controller 10 displays the guide message enabling the driver to select the circuit explanation function via the display device of the input/output unit 18, and then checks whether the driver select the circuit explanation function (S20). Furthermore, when the user selects the circuit explanation function, the guide control unit 13 performs the circuit explanation function (S21).

In the circuit explanation function, information for explaining and informing about the corresponding circuit by using the information related to the circuit may be output via the output apparatus of the input/output unit 18 before driving the circuit. If the driver does not select the circuit explanation function, the circuit explanation function is omitted and the instructor function or the ghost car function may be performed.

As such, when the circuit explanation function is not selected or a circuit explanation process is finished, the guide control unit 13 of the controller 10 displays a guide message enabling the driver to select one of the instructor function or the ghost car function via the display device of the input/output unit 18.

Then, after the guide control unit 13 checks whether the driver selects the instructor function or the ghost car function (S22), the guide control unit 13 performs the instructor function when the guide control unit 13 determines that the driver selects the instructor function (S23). In the instructor function, in the output devices of the input/output unit 18, not only the display device but also the sound output device including the vehicle speaker may be additionally used.

In the instructor function, during driving the circuit, a voice guide function informing a situation before and after the vehicle enters each section of the circuit may be performed based on the real-time position information of the vehicle and the information related to the circuit including circuit section information.

In addition, during driving the circuit, a voice guide function providing voice information for improving a record may be performed based on a record of each section of the circuit. In the present disclosure, each circuit is sectioned into a plurality of circuit sections beforehand. The information related to the circuit may include start position information and end position information of each circuit section.

Accordingly, in the present disclosure, a voice guide function outputting and providing voice information for each circuit section that composes the corresponding circuit. During performing such an instructor function, the guide control unit 13 determines whether the circuit driving is finished (S24), and the analysis function may be performed by the guide control unit 13 when the circuit driving is finished (S27).

In addition, when the guide control unit 13 determines that the driver selects the ghost car function rather than the instructor function, the guide control unit 13 enables the ghost car function to be performed (S25). In the ghost car function, during the circuit driving, a ghost car may be displayed on the HUD so that the feeling of being in a real car race is provided to the driver. The AR HUD indicating various information as an augmented reality image may be used as the HUD.

The ghost car is a virtual vehicle that is a reference to the driver. Furthermore, in the ghost car function, as an example, the virtual vehicle that is the reference may be displayed by using the AR HUD. In the ghost car function, the ghost car is a vehicle set up to look like a ghost by adjusting transparency of the ghost car such that the driving of the driver such that the ghost car does not interfere with the driving of the driver.

In the ghost car function, the ghost car may be displayed by using vehicle information of the ghost car. The ghost car may be displayed after the vehicle information of the ghost car is compared with the real-time position information of the vehicle input from the vehicle position recognizing unit 11, the real-time vehicle state information of the vehicle acquired from the traveling state determining unit 12 via the driving information detection unit 17 and then input, the information related to the circuit received from the service providing server 20, and so on.

Moreover, information such as a record line that can aid reducing of a record, the vehicle state information, a comparison value between drivers, and so on may be displayed. In addition, according to a preference of the driver, a displayed state or a shape of the ghost car, other setting values related to the ghost car may be input and changed via the input device of the input/output unit 18.

While performing such a ghost car function, the guide control unit 13 determines whether the circuit driving is finished (S26), and the analysis function may be performed by the guide control unit 13 when the circuit driving is finished (S27).

The analysis function in the circuit guide function is a function of analyzing the entire circuit record (lap time) and the record for each section of the circuit after driving the circuit. The entire record and the record for each section may be displayed and output to the driver via the output device of the input/output unit 18, or a current record may be compared with a previous record of the driver and displayed. In addition, records of other drivers transmitted via the communication unit 16 from the service providing server 20 may be compared and displayed.

In addition, in the analysis function, the entire record of the circuit, the record of each section of the circuit, a driving result, a record analysis, and a vehicle moving route and vehicle driving information (the vehicle state information) of the entire circuit and each section of the circuit may be compared with a record of another driver, a vehicle moving route and vehicle driving information (the vehicle state information) of another driver, and a comparison result may be displayed on the display device of the input/output unit 18.

In addition, in the analysis function, the information for each section of the circuit is aggregated and an optimal route and a driving skill that are capable of reducing the record may be guided by using an Artificial Intelligence (AI) technology.

In addition, whether the vehicle is separated from the circuit may be determined in the guide control unit 13 of the controller 10 based on the current position information of the vehicle input from the vehicle position recognizing unit 11 and the circuit position information received and input via the communication unit 16 from the service providing server 20 or the add-on device 30.

As such, when it is determined that the vehicle is separated from the circuit, the guide control unit 13 releases the circuit mode and switches the vehicle system 19 to the normal mode that is the real-life driving move in the normal state.

In this manner, according to the system for enabling the vehicle to perform the circuit mode, since helpful information that the driver needs is transmitted and the circuit guide function is provided during the circuit driving, the driver's understanding of the vehicle and the circuit may be increased. Furthermore, the desire of speed competition of the driver and the desire of enjoyable driving of the driver may be satisfied, and there is an effect that a commercial value of the vehicle may be further increased.

Although embodiments of the present disclosure have been described in detail, the scope of the prevent disclosure is not limited to these embodiments, and various modifications and improvements devised by those ordinarily skilled in the art using the fundamental concept of the present disclosure, which is defined by the appended claims, further fall within the scope of the present disclosure.

What is claimed is:

1. A system for enabling a vehicle to perform a circuit mode, the system comprising:
   a communication unit provided in the vehicle and configured to communicate with a vehicle-external device;
   a service providing server provided in the vehicle-external device and configured to provide information related to a circuit;
   a controller configured to:
   switch the system from a normal mode that is a real-life driving mode in which the vehicle drives on a normal road to a circuit mode in which the vehicle drives on a designated racing road, or from the circuit mode to the normal mode, wherein the controller is configured to release a limit value of a vehicle system for operating the vehicle when the vehicle enters the circuit mode,
   recognize a current position of the vehicle by receiving a signal related to a vehicle position,
   determine whether the vehicle arrives at the circuit based on the current position of the vehicle and the information related to the circuit received from the service providing server via the communication unit, and perform control for a circuit guide function that provides guide information related to the circuit mode and circuit driving when the vehicle enters the circuit mode; and an input/output unit configured to output and provide the guide information related to the circuit mode and the circuit driving to a driver by controlling the controller.

2. The system of claim 1, further comprising a Global Positioning System (GPS) receiving unit provided in the vehicle and configured to receive a GPS signal, wherein the controller is configured to receive the GPS signal from the GPS receiving unit or a signal received from the vehicle-external device via the communication unit, and wherein the GPS signal and the signal are the signal related to the vehicle position, thereby recognizing the current position of the vehicle.

3. The system of claim 1, wherein the controller is configured to change a fail safety condition about an apparatus or a component of the vehicle system as the limit value of the vehicle system is released.

4. The system of claim 1, wherein the vehicle system comprises an operating apparatus that operates the vehicle.

5. The system of claim 1, wherein the vehicle system comprises: a motor operating the vehicle, an inverter for operating and controlling the motor, and a battery connected to the motor and configured to be charged or discharged via the inverter, and wherein the limit value of the vehicle system includes at least one of a battery usage limit value, a motor usage limit value, a maximum vehicle speed, or a motor torque limit value.

6. The system of claim 1, wherein the controller is configured to release the circuit mode and switch a vehicle system into a normal mode that is a real-life driving mode in a normal state when the controller determines that the vehicle is separated from the circuit based on the current position of the vehicle and the information related to the circuit.

7. The system of claim 1, wherein the vehicle-external device comprises a smart device connected to the communication unit, wherein the controller is configured to recognize the current position of the vehicle from the signal related to the vehicle position received from the smart device via the communication unit, and the controller is configured to optionally receive the information related to the circuit from the smart device via the communication unit.

8. The system of claim 1, further comprising a driving information detection unit configured to detect vehicle driving information, wherein the controller is configured to perform the control for the circuit guide function by using the information related to the circuit received from the service providing server and real- time vehicle driving information.

9. The system of claim 1, wherein the input/output unit comprises:

an input device controlled by a driver to input and select desired information related to the circuit mode and the circuit driving; and a display device configured to indicate and output the guide information related to the circuit mode and the circuit driving.

10. The system of claim 9, wherein the input/output unit further comprises a sound output device configured to output the guide information related to the circuit mode and the circuit driving through sound.

11. The system of claim 9, wherein the display device comprises an Augmented Reality (AR) head-up display configured to display information as an augmented reality image on a windshield glass of the vehicle.

12. The system of claim 9, wherein the system is configured such that setting values related to the circuit mode is capable of being input and set by moving to a user setting mode via the input device and the display device, and the controller is configured to enable the vehicle to enter the circuit mode when the vehicle arrives and enters the circuit while the circuit mode is set to be turned on via the user setting mode.

13. The system of claim 9, wherein the controller is configured to control operation of the display device so that vehicle state information or driver driving input information regarded as real-time vehicle driving information collected from the vehicle, or information related to performance of the vehicle is further displayed together with the guide information related to the circuit mode and the circuit driving.

14. The system of claim 9, wherein, when the vehicle enters the circuit mode, information displayed on the display device by the controller is changed and displayed to a preset layout for the circuit mode.

15. The system of claim 1, wherein the circuit guide function comprises:

a circuit explanation function to output information for explaining and informing about the circuit before the circuit driving; and an instructor function to output and inform a situation before and after entering each circuit section of the vehicle during the circuit driving based on real-time position information of the vehicle and based on the information related to the circuit including circuit section information, the instructor function outputting and informing information for improving a record based on a record of each section of the circuit.

16. The system of claim 15, wherein the circuit guide function further comprises a ghost car function comparing and displaying a state of the vehicle and a state of a ghost car during the circuit driving by using the real-time position information of the vehicle, real- time vehicle state information collected from the vehicle, the information related to the circuit received from the service providing server, and information of the ghost car that is a virtual racing vehicle.

17. The system of claim 15, wherein the circuit guide function further comprises an analysis function which analyzes driving results and records of an entire circuit and each section of the circuit after finishing the circuit driving and which outputs and informs vehicle moving routes and vehicle state information of the entire circuit and each section of the circuit.

18. A system for enabling a vehicle to perform a circuit mode, the system comprising:

a communication unit provided in the vehicle and configured to communicate with a vehicle-external device;

a service providing server provided in the vehicle-external device and configured to provide information related to a circuit;

a controller configured to:

switch the system from a normal mode that is a real-life driving mode in which the vehicle drives on a normal road to a circuit mode in which the vehicle drives on a designated racing road, or from the circuit mode to the normal mode, wherein the controller is configured to release a limit value of a vehicle system for operating the vehicle when the vehicle enters the circuit mode, recognize a current position of the vehicle by receiving a signal related to a vehicle position, determine whether the vehicle arrives at the circuit based on the current position of the vehicle and the information related to the circuit received from the service providing server via the communication unit, and perform control for a circuit guide function that provides guide information related to the circuit mode and circuit driving when the vehicle enters the circuit mode; and an input/output unit configured to output and provide the guide information related to the circuit mode and the circuit driving to a driver by controlling the controller, wherein the system is configured to allow setting of values related to the circuit mode by moving to a user setting mode via an input device and a display device of the input/output unit.

19. The system of claim 18, wherein the circuit mode is turned on or turned off in the user setting mode, wherein:

when the circuit mode is turned on and the vehicle enters the circuit, the circuit mode is performed by the controller, and when the circuit mode is turned off, the circuit mode is not performed.

* * * * *